Dec. 14, 1965 R. G. MINER 3,223,149
INDUCTION UNIT PRIMARY AIR CONTROL
Filed July 9, 1962 2 Sheets-Sheet 2

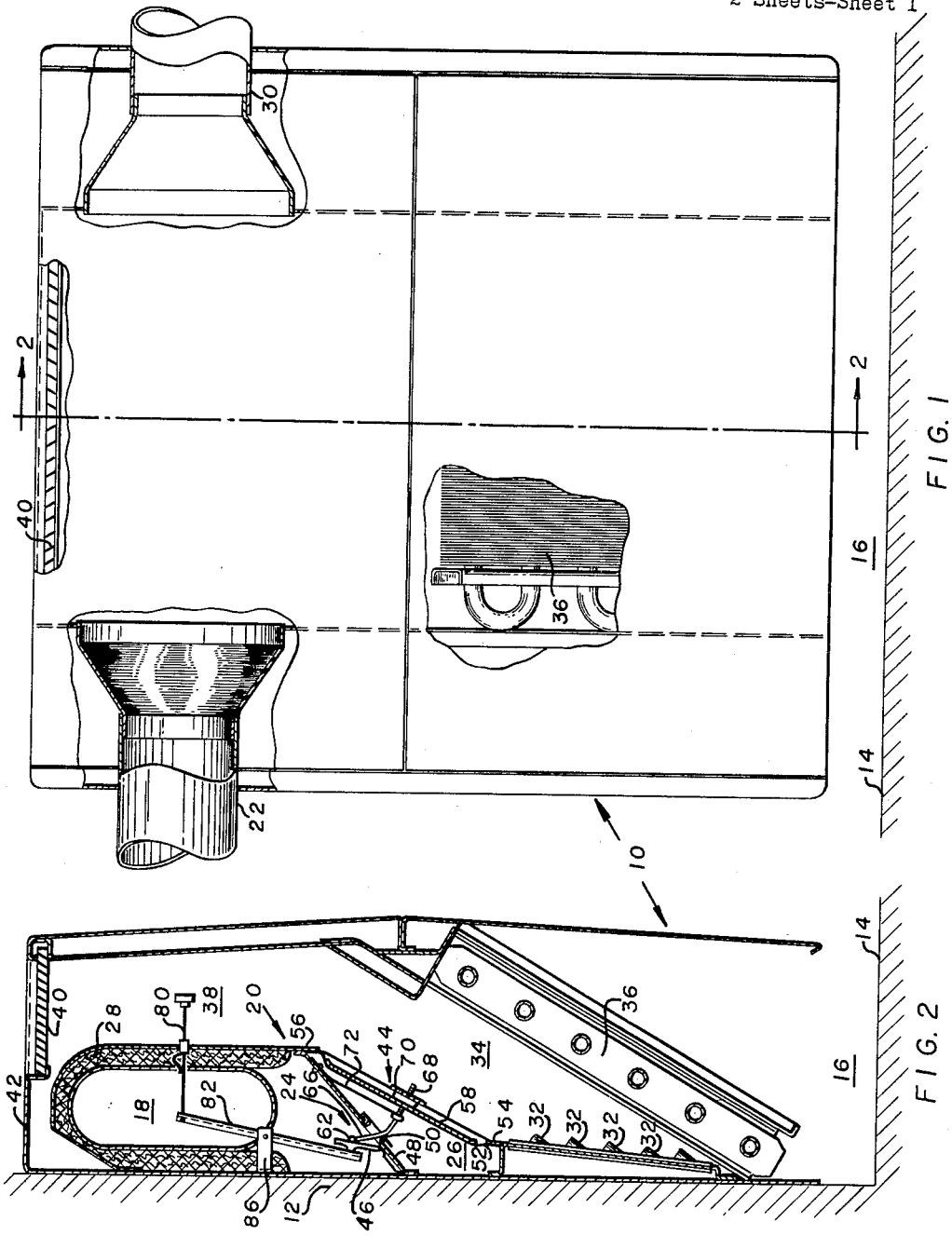

INVENTOR.
ROBERT G. MINER
BY
*Holmes & Andersen*
ATTORNEYS

United States Patent Office 3,223,149
Patented Dec. 14, 1965

3,223,149
INDUCTION UNIT PRIMARY AIR CONTROL
Robert G. Miner, La Crosse, Wis., assignor to The Trane Company, La Crosse, Wis., a corporation of Wisconsin
Filed July 9, 1962, Ser. No. 208,238
9 Claims. (Cl. 165—33)

This invention relates generally to induction type air conditioning units which use a source of conditioned primary air to induce a flow of secondary air and more particularly to induction units which employ a dual primary air chamber with a means between the chambers to control the flow of primary air from one chamber to the other.

Air conditioning units of the type which employ primary conditioned air as a motive power for secondary air normally have to be balanced individually when installed in a system. Balancing of these units has been a constant source of trouble since a change in the air quantity to one unit will be reflected in the other units because the system is receiving a fixed quantity of conditioned primary air. Also, in recent years the industry has tended to use these units in series employing the primary air chamber of one unit as a conduit to transmit primary air to the next adjacent unit in the series. Again, a change in one unit in the series would be reflected in the other units in the series. The industry therefore has been attempting to design an induction type air conditioning unit which can be readily balanced and maintains such balance regardless of changes in the air balance in the system elsewhere.

It is therefore an object of this invention to provide an induction unit which can be readily balanced.

Another object of the invention is to provide an induction unit which can be easily and inexpensively manufactured.

A third object of the invention is to provide an induction unit which maintains a constant pressure at the induction nozzles regardless of the pressure variations in the primary air system.

A still further object of the invention is to provide an induction unit which can be installed in series with other induction units and which will maintain a constant pressure at the induction nozzles regardless of the primary air settings of the other units in the series.

A fifth object of the invention is to provide an induction unit with a dual primary air chamber in which the flow of primary air from the first chamber to the second chamber is automatically controlled to maintain a constant pressure at the induction nozzles.

Another object of the invention is to provide a dual primary air chamber induction unit in which the control that maintains constant pressure at the induction nozzles forms a portion of the wall of the second primary air chamber.

A seventh object of the invention is to provide a dual primary air chamber induction unit which employs a positive shutoff control for an automatically pressure controlled damper located between the two primary air chambers of the unit.

Other objects and advantages of my invention will be clearly apparent as the specification proceeds to describe the invention with reference to the accompanying drawings, in which:

FIGURE 1 is a front elevation view of the unit with a part of the cabinet broken away to show certain details;

FIGURE 2 is a cross-section view taken on line 2—2 of FIGURE 1;

Figure 3:
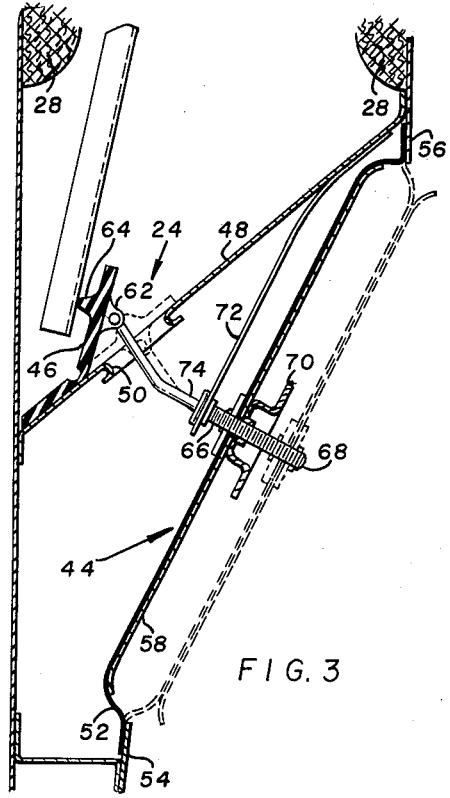
FIGURE 3 is a blown-up view partially in section showing the adjustable damper control.
Figure 4:
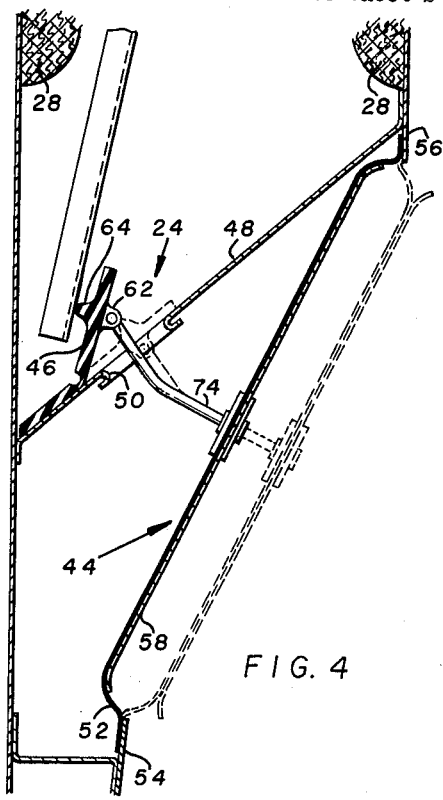
FIGURE 4 is a blown-up view partially in section of the damper connecting rods which are fixed to the control member outwardly from the center damper control shown in FIGURE 3.
Figure 5:
FIGURE 5 is a top view of the elastomer hinge and control damper.
Figure 6:
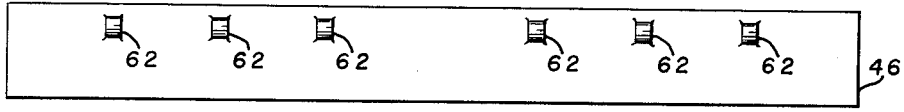
FIGURE 6 is a bottom view of the hinge and control damper shown in FIGURE 5.

Referring now to FIGURES 1 and 2, reference numeral 10 denotes a heat exchange unit of the induction type. Preferably induction unit 10 is mounted on a wall 12 a predetermined distance above the floor line 14 to define a kickspace 16 for the introduction of room air into the unit. This air is commonly referred to as secondary air.

In operation, primary conditioned air having a total pressure on the order of ½" to 5" water gauge is introduced into chamber 18 of the primary air plenum chamber 20 through inlet 22. A regulator 24 to be described in detail hereinafter regulates the flow of primary air from chamber 18 to chamber 26. Acoustical insulation 28 is connected to the walls of primary air chamber 18 to dampen the inherent sound in the primary air stream. An outlet conduit 30 is shown connected to the primary air chamber 18 for the purpose of supplying primary air to an induction unit downstream. If there are no downstream units, conduit 30 will not be employed and a block-off plate will close the opening normally provided for conduit 30.

Primary air ejected from the nozzles 32 into the inducing chamber 34 induces secondary air from the kickspace 16 through the heat exchange coil 36. The induced secondary air mixes in the upper mixing chamber 38 with the primary air from the nozzles 32 and is discharged into the conditioned area through discharge grill 40 in the top panel 42 of the heat exchange unit 10.

In units of this type it is necessary to control the primary air pressure in chamber 26 in order to obtain a fixed flow of air through nozzles 32 to induce a predetermined flow of secondary air across the heat exchange coil 36. This results in a predetermined flow of conditioned air through discharge grill 40. To obtain the result, the flow of primary air from primary air chamber 18 to primary air chamber 26 is automatically controlled. In this manner the pressure in primary air chamber 26 is independent of the fluctuations in the pressure of the primary air supplied to the primary air chamber 18.

In the preferred embodiment of the invention, the pressure in chamber 26 is maintained substantially constant by the use of a diaphragm member 44 which controls the opening and closing of hinge member or damper 46 attached to the partition 48, to vary the effective opening of slot 50 in the partition 48 separating primary air chamber 18 from primary air chamber 26.

Diaphragm member 44 consists of an elongated flexible member 52 of neoprene or other suitable material attached in any suitable manner to the walls of primary air chamber 26 at 54 and 56. A back up plate 58 is positioned adjacent to flexible member 52 to provide rigidity to the center portion of the flexible member 52.

Hinge member 46 preferably is a commercially available molded elastomer member. Looking at FIGURES 2-6, elastomer hinge member 46 is cemented or otherwise secured to partition 48 in such a position that pivot flanges 62 overlie slot 50. A channel 60 is made in hinge member 46 during molding to provide a flexure area for the hinge. A ridge 64 is molded into the hinge 46 primarily to provide strength to the hinge.

Hinge member 46 is secured to the diaphragm member 44 by a plurality of rods 74 pivotally connected to pivot flanges 62 along the length of the diaphragm member 44.

Figures 7, 8, 9:
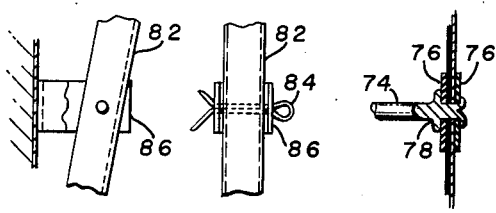
FIGURES 7 and 8 are front and side views of the pivot connection for the shutoff control arm.
FIGURE 9 is a cross-section view showing the attachment of the connecting rod of FIGURE 4 to the diaphragm member.
Figure 10:
FIGURE 10 is a section view of the attachment of the manual shutoff control to the shutoff control arm.

Looking at FIGURE 9, rod members 74 are shown secured to washers 76 located on both sides of diaphragm member 44 by projecting rods 74 through the washer until collar 78 on rods 74 abuts the washer on one side of the diaphragm member and then staking or otherwise securing the other end of the rods 74 to the washer on the other side of diaphragm member 44.

Looking at FIGURE 3, there is shown a threaded bolt member 66, preferably located centrally of the diaphragm member 44. An adjustable nut 70 is provided on the threaded end 68 of the bolt member 66 which projects through the diaphragm member 44. A spring steel member 72 is provided on the other end 71 to bias the hinge member 46 to the open position.

*Operation*

In operation, adjustable nut 70 is rotated to set the desired position of diaphragm member 44 in order to provide the desired opening of slot 50 to supply the desired quantity of air at the desired pressure to the nozzles 32 in order to discharge a predetermined quantity of air through discharge grill 40. Once the position of diaphragm member 44 has been set the opening and closing of the hinge member 46 will be automatically controlled to provide the desired pressure in primary air chamber 26 at the nozzles 32.

This automatic control is accomplished by the relative pressures in the unit. The pressure in the inducing chamber 34 is substantially atmospheric. When the pressure in primary air chamber 18 increases or decreases, such increase or decrease of pressure will be reflected by an increase or decrease of pressure in chamber 26 and against the diaphragm member 44. If the pressure in primary air chamber 26 increases, the diaphragm member 44 will move towards the inducing chamber 34 against the bias of spring 72 causing the hinge member to throttle the flow of primary air through slot 26 to maintain the desired pressure in chamber 26. Conversely, if the primary air pressure in chamber 18 decreases, spring member 72 will cause the hinge member 44 to open the slot 50 allowing increased flow of primary air into the primary air chamber 26 and thereby compensating for the reduction of pressure in the primary air chamber 18.

If desired, hinge member 46 can be manually pivoted to the closed position to shut off the unit by pushing control rod 80 inwardly causing control lever 82 to act against strengthening rib 64 to pivot hinge member 46 to the closed position over slot 50.

Control lever 82 is a channel bar of predetermined length and is pivotally secured by a cotter pin 84 in channel brace 86. Control rod 80 has a hook 88 on the end thereof which projects into the top end of the channel bar.

My invention has numerous advantages not readily available in prior art devices. I have provided a dual primary air chambered induction unit which can be readily balanced and which automatically compensates for fluctuations in other parts of the primary air system. My unit eliminates the unnecessary labor involved of having to rebalance the units in a system after changes have been made in other portions of the system. My new and improved induction unit also provides a simple and inexpensive method of positive shutoff of the individual units in the system. My new and improved induction unit also is very compact and comparatively inexpensive to manufacture since my new and improved control forms a portion of the wall of the primary air plenum chamber.

Although I have described in detail the preferred embodiment of my invention, I contemplate that many changes may be made without departing from the scope or spirit of my invention and I desire to be limited only by the claims.

I claim:

1. An air conditioning unit adapted to be mounted in a conditioned space comprising: a casing, means forming a discharge opening in said casing, means forming a recirculated air opening in said casing, passage means in said casing connecting said recirculated air opening and said discharge opening a heat exchanger in said passage means between said recirculated air opening and said discharge opening, enclosing wall means forming a primary air plenum chamber in said casing, means supplying air under pressure to said primary air plenum chamber, nozzle means connected to said primary air plenum chamber and receiving air under pressure therefrom to induce a flow of recirculated air through said heat exchanger, and automatic pressure responsive means in said primary air plenum chamber to maintain a substantially constant pressure at said nozzle means regardless of the fluctuations in the pressure being supplied to said primary air plenum chamber, said automatic pressure responsive means having a pressure responsive member which forms a substantial portion of said enclosing wall means.

2. The structure of claim 1 wherein a manual shutoff means is provided to engage said automatic pressure responsive means to override said automatic pressure responsive means to cut off the supply of air under pressure to said nozzle means.

3. An air conditioning unit adapted to be mounted in a conditioned space comprising: a casing, means forming a discharge opening in said casing, means forming a recirculated air opening in said casing, passage means in said casing connecting said recirculated air opening and said discharge opening a heat exchanger in said passage means between said recirculated air opening and said discharge opening, enclosing wall means forming a primary air plenum chamber in said casing, partition means in said primary air plenum chamber dividing said primary air plenum chamber into a first chamber and a second chamber, means supplying air under pressure to said first chamber, means forming an opening in said partition means to supply air under pressure from said first chamber to said second chamber, nozzle means in flow communication with the air under pressure in said second chamber to induce a flow of recirculated air through said heat exchanger, movable damper means positioned adjacent said opening in said partition means, and automatic pressure responsive means operably connected to said damper means to control the opening and closing of said damper means in response to variation of air pressure in said first chamber to maintain a substantially constant pressure at said nozzle means, said automatic pressure responsive means having a pressure responsive member which forms a substantial portion of said enclosing wall means.

4. The structure of claim 3 wherein a manual shutoff means engages said movable damper means to override said automatic pressure responsive means to cut off the supply of air under pressure to said second chamber.

5. The structure of claim 3 wherein said enclosing wall means includes a dividing wall between said passage means and said second chamber forming an integral portion of both said second chamber and said passage means, and wherein said pressure responsive member forms a substantial portion of said dividing wall.

6. The structure of claim 5 wherein said movable damper means is an elastomer hinge.

7. The structure of claim 6 wherein said elastomer hinge is connected to said partition means.

8. An air conditioning unit adapted to be mounted in a conditioned space comprising: a casing, means forming a discharge opening in said casing, means forming a recirculated air opening in said casing, passage means in said casing connecting said recirculated air opening and said discharge opening a heat exchanger in said passage means between said recirculated air opening and said discharge opening, enclosing wall means forming a primary air plenum chamber in said casing, partition means in said primary air plenum chamber dividing said primary air plenum chamber into a first chamber and a second chamber, means supplying air under pressure to said first chamber, means forming an opening in said partition means to supply air under pressure from said first chamber to said second chamber, nozzle means in flow communication with the air under pressure in said second chamber to induce a flow of recirculated air through said heat exchanger, flexible damper means projecting over said opening in said partition means, automatic pressure responsive means operably connected to said flexible damper means to control the opening and closing of said flexible damper means in response to variation of air pressure in said first chamber to maintain a substantially constant pressure at said nozzle means, said flexible damper means having a reinforcing rib on one side thereof, and manually operated control means projecting through said primary air plenum and engaging said reinforcing rib to provide positive shut-off of said opening in said partition means regardless of the setting of said automatic pressure responsive means, said automatic pressure responsive means having a pressure responsive member which forms a substantial portion of said enclosing wall means.

9. An air conditioning unit adapted to be mounted in a conditioned space comprising a casing, means forming a discharge opening in said casing, means forming a recirculated air opening in said casing, a heat exchanger in said casing downstream of said recirculated air opening and upstream of said discharge opening, enclosing wall means forming a primary air plenum chamber in said casing extending horizontally in said casing, a generally horizontally extending elongated partition in said primary air plenum chamber dividing said primary air plenum chamber into a first horizontally extending chamber and a second horizontally extending chamber, means adjacent one end of said first chamber for supplying air under pressure to said first chamber, means adjacent the opposite end of said first chamber adapted to supply other air conditioning units with primary air from said first chamber, means forming an elongated opening in said partition to supply air under pressure from said first chamber to said second chamber, nozzle means in flow communication with the air under pressure in said second chamber to induce a flow of recirculated air through said heat exchanger, an elongated damper means mounted adjacent said elongated opening for controlling the flow of air through said opening, and an elongated pressure sensitive diaphragm operatively connected to said damper means for control thereof, said enclosing wall means including a wall serving to define said second chamber, and said elongated diaphragm forming a substantial portion of said wall.

References Cited by the Examiner
UNITED STATES PATENTS

| | | | |
|---|---|---|---|
| 2,314,569 | 3/1943 | Baker | 98—38 X |
| 2,995,078 | 8/1961 | Ringquist et al. | 98—38 |
| 3,058,664 | 10/1962 | Donahue | 98—38 X |
| 3,070,346 | 12/1962 | Kennedy | 98—41 X |
| 3,122,201 | 2/1964 | Ashley et al. | 165—123 |

ROBERT A. O'LEARY, *Primary Examiner.*

CHARLES SUKALO, *Examiner.*